United States Patent
Speicher et al.

(10) Patent No.: US 6,671,602 B1
(45) Date of Patent: Dec. 30, 2003

(54) METHOD FOR MANUALLY STIPULATING THE TRANSMISSION RATIO OF A CONTINUOUSLY VARIABLE TRANSMISSION (CVT)

(75) Inventors: Patrick Speicher, Oberteuringen (DE); Ralf Vorndran, Eriskirch (DE); Anton Welte, Friedrichshafen (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 10/019,764

(22) PCT Filed: Apr. 29, 2000

(86) PCT No.: PCT/EP00/03899

§ 371 (c)(1),
(2), (4) Date: Feb. 20, 2002

(87) PCT Pub. No.: WO00/68602

PCT Pub. Date: Nov. 16, 2000

(30) Foreign Application Priority Data

May 8, 1999 (DE) .......................................... 199 21 500

(51) Int. Cl.$^7$ ............................................. B60K 41/28
(52) U.S. Cl. .............................. 701/52; 701/57; 701/62; 477/86; 477/174
(58) Field of Search ............................ 701/51, 52, 55, 701/57, 62, 67; 477/37, 45, 46, 48, 140, 86, 174

(56) References Cited

U.S. PATENT DOCUMENTS

| | | | |
|---|---|---|---|
| 4,836,056 A | 6/1989 | Nakawaki et al. ............ | 74/866 |
| 5,514,046 A | 5/1996 | Petersmann et al. .......... | 477/39 |
| 5,545,106 A | 8/1996 | Senger et al. ................ | 477/43 |
| 5,655,991 A | 8/1997 | Lardy et al. ................. | 477/46 |
| 5,688,204 A | 11/1997 | Runge et al. ................ | 477/46 |
| 6,019,701 A | 2/2000 | Mori et al. .................. | 477/46 |
| 6,035,734 A * | 3/2000 | Le Van ........................ | 74/335 |
| 6,086,506 A | 7/2000 | Petersmann et al. .......... | 477/45 |
| 6,173,227 B1 | 1/2001 | Speicher et al. ............. | 477/43 |

FOREIGN PATENT DOCUMENTS

| | | | |
|---|---|---|---|
| DE | 41 20 540 C1 | 11/1992 | ........... F16H/59/06 |
| DE | 41 20 546 A1 | 12/1992 | ........... F16H/59/24 |
| DE | 43 12 415 A1 | 10/1994 | ........... F16H/59/06 |
| DE | 43 12 718 A1 | 11/1994 | ........... F16H/59/06 |
| DE | 44 11 938 A1 | 10/1995 | ........... F16H/59/06 |
| DE | 196 00 915 A1 | 7/1997 | ........... F16H/59/06 |
| DE | 198 09 705 A1 | 9/1998 | ........... F16H/59/06 |
| EP | 0 697 548 A1 | 2/1996 | ........... F16H/61/00 |

* cited by examiner

*Primary Examiner*—Thomas G. Black
*Assistant Examiner*—Arthur D. Donnelly
(74) *Attorney, Agent, or Firm*—Davis & Bujold PLLC

(57) ABSTRACT

The invention relates to a method for manually stipulating the transmission ratio of a continuously variable transmission (CVT) for a motor vehicle. The CVT comprises a control device, a shifting or selecting device, a starting element and a variator for adjusting the transmission ratio which is driven, in particular, by an internal combustion engine. The control device processes input signals derived from a driver-vehicle system within the framework of an operational strategy for stipulating the transmission ratio, the rotational speed of the drive motor or a variator input rotational speed. In a first automatic operation mode, the operational strategy automatically selects the transmission multiplication. In a second manual operational mode, the driver can directly intervene, via the shifting or selecting device, in the selection of the transmission multiplication. The invention provides, in the second mode of operation, that preset, continuous and vehicle speed-dependent engine rotational speed progressions or variator input rotational speed progressions or transmission ratio progressions can be manually selected. The progressions are displayed as curve traces within upper and lower limits of the adjustment range such that vehicle stand still and a highest possible speed of the vehicle can be attained in each progression.

23 Claims, 3 Drawing Sheets

METHOD FOR MANUALLY STIPULATING THE TRANSMISSION RATIO OF A CONTINUOUSLY VARIABLE TRANSMISSION (CVT)

FIELD OF THE INVENTION

A method for manually stipulating the ratio of a continuously variable transmission (hereinafter, "CVT").

BACKGROUND OF THE INVENTION

The operational strategy of a CVT is first normally to allow comfortable driving and second to achieve a favorable consumption of fuel. As for good drivability, essential criteria lie in a proper relation between the speed of rotation (hereinafter, "RPM") of the motor and the speed, in the motor dynamics, and in meeting such vehicle performance as is desired by a driver. Additionally, consideration must be given to adaption to the circumstances of travel, i.e., to city or mountain driving. Also, reliable downshifting into the highest ratio (LOW) upon stopping must be considered. Further, intervention by the driver during shifting must be easily carried out. For a satisfactory fuel consumption, what is to be striven for, is an extended period of operation in the most efficient zone of the characteristic curve of the motor, as well as a lowering of the RPM of the motor during a period when travel conditions are constant. Since the named criteria for operational strategy of a CVT are, in part, self contradictory, a compromise is normally struck.

In order to combine the advantages of a continuous change of the transmission ratio, with known gear change behavior and the motor acoustics of an automatic staged gear change transmission associated therewith, U.S Pat. No. 4,836,056 proposes to automatically switch the operational strategy of the CVT over to a control, which is based on a shifting-characteristic curve. This switchover is effected automatically, dependent upon a threshold signal representing the motor load. The achieved gear change behavior of the CVT can, in this case, be likened to an automated gear change with a very soft torque converter in which a converter bypass clutch is always open up to a particular throttle flap threshold. The RPM behavior of the motor can be regarded negatively by the driver, described as producing a "seat of the pants" effect or "rubber band effect".

In order to bring the operational behavior of the CVT to automatically coincide better with the desires of the driver and the influences of the travel conditions, adaptive driving strategies have become known.

For instance, DE-OS 43 12 415 proposes to adjust the ratio by means of more than one type of characteristic curve of the motor map. In doing this, the operational point direction is carried out in an area between a characteristic curve of optimal fuel consumption and a characteristic curve of optimal motor loading. The operational points, between these limiting lines, lie on so-called dynamic characteristic curves, the position of which is dependent on the magnitude of the speed of change of the load demand. The choice of the shift-characteristics and the current dynamic characteristic curve, along which the operational point is directed, is done automatically.

DE-PS 41 20 546 describes an operational strategy for a CVT wherein there is a control characteristic curve according to which the continuous ratio selfadjusts in relation to the position of the throttle valve flap and the RPM of the motor. The said control line, however, represents the driving style, that is, the driving activity of the driver. The data for this "style" characteristic curve, however, is automatically selected from a multiplicity of control characteristic curves previously stored in the memory of the transmission control. The evaluation of the driver's style, that is the driving activity, is a complex function and the cost in time and money in ifs application is correspondingly great.

In DE-OS 196 00 915, the applicant describes a procedure for the guidance of an operating point, in an operational mode in which the actual preselected position of the operational point, is in a state of being continually newly determined within a predetermined zone of driving with an upper and a lower limit activated by the function of an actual, essentially drive-dependent, unfiltered input signal. Based on this, the location of the operational point in the transmission variogram is continually being computed anew and predominately defined by the activities of the driver in this case.

In all procedures for automatic operational point guidance, the disadvantage is that, in spite of the applications of great efforts, not all the desires of the driver can be fulfilled, in particular, a desire to be able to make a manual intervention during shifting.

To offset this particular disadvantage, DE-PS 41 20 540 proposes that along with a first operational mode of automatic driving strategy, a second is to be created in which the driver, by means of manual intervention, can simulate the operational behavior of a multistage transmission. For this situation, a number of set, constant ratios, i.e. shift movements, for example, are input and stored in a characteristic map. If the driver gives a manual shift command to the transmission, then the choice of the constant transmission ratio is generated from the said characteristic map relative to a driving activity. Upon the transition from the first operational mode into the second manual operational mode, by means of a selection-apparatus which is manipulated by the driver, a transition function controls the jump of the actual transmission ratio, which is running at the moment of change of operational mode, onto the next successive, constant, predetermined ratio. In order to better represent the desires of the driver during the manual type of shifting operation, DE-PS 41 20 540 proposes further to select the gear change jump out of groups of predetermined constant ratios, which simulate different characteristics of shifting, for example, a fuel consumption optimized, an economic ratio and a load optimizing, sport characteristic.

In the case of the simulation of a stage transmission with constant ratios as a manual operational strategy for a CVT, the disadvantage lies especially in the diminishing of drivability in the functional area of the operational map. In this way, the motor can be throttled down in the lower speed zone by a ratio which is so low that the motor stalls which, for a normal automatic driver, would present surprising behavior for the vehicle. Also, the available power for start would be surprisingly low if the driver had negligently forgotten to shift down through all gears upon stopping. Because of the customary spread advantage of the continuous transmission, during a start-up situation, the driver must change the gears very quickly, in the lower speed areas, in order to achieve an optimum acceleration. As a solution for this problem, DE-PS 41 20 540 proposes a forced high shifting or a forced up-shifting in fixed, predetermined gear changes, this being triggered when threshold speeds are reached.

EP 0 697 548 A1 describes a driving strategy for a CVT, in which, for a second operational mode, discrete, manually preselective, vectors are provided, which all intersect at a virtual zero-point. This virtual zero-point lies outside of the variogram of the CVT in the negative vehicle speed area and the positive motor RPM area. This, then, makes it impossible in all manual, preset vectors to achieve the start-up ratio LOW and the maximum vehicle speed.

SUMMARY OF THE INVENTION

Thus, the invention has the purpose of creating a method for stipulating the ratio of a CVT with a first, automatic operational mode and a second, manual operational mode in which the driver has direct intervention in the choice of ratio and wherein there will be an improvement in the operational behavior in the manual operational mode.

The purpose of the invention is achieved in that the driver, in the manual operational mode of the CVT, can manually predetermine, by means of a shift or selector apparatus, the RPM of the motor which is dependent upon a non-staged, vehicle velocity.

In accord with the invention, it is proposed, to so simulate the manually selectable curve of the RPM of the motor as an optional curve profile within the adjustability area of the transmission variogram, that with each RPM curve, both the start-up ratio (LOW) and the highest speed of the vehicle can be achieved.

The predetermined motor RPM curves are processed within the electrohydraulic control of the CVT and/or processed in accord with regulation/control technology and issued as predetermined ratios to the variator. The invented, manually selectable, motor RPMs can be expressed also as vehicle speed-dependent variator input RPMs or as variator ratio curves. The carry-over function between the motor RPM and the variator input RPM is then to be correspondingly considered, by a torque converter as a start-up element between motor and variator for instance, as a converter characteristic curve.

As to the invention, there lies on the one hand, the subjective sensitivity of the driver in the judgement of the connection of the motor RPM and the driving load. On the other hand are the technical presuppositions of the CVT, considering the adjustability area of ratio change as well as the possibilities for guidance of the operational point.

Besides the driving noise associated with the speed, the acoustic sensitivity of the driver orients itself on the RPM of the motor. This is particularly true for the manual operational mode of the transmission operation in which the driver knowledgeably intervenes in the operational point guidance of the motor. In this case, the invented method presents advantages through the direct driver engendered stipulation of motor RPM curves.

Normally, CVTs, in comparison to automatic stage transmissions, have an advantage in spread. The total spread is designedly incorporated into the LOW (largest ratio) and the overdrive (OD) (smallest ratio). Usually, the start-up ratio LOW of a CVT is less than the ratio of the first stage of an automatic, staged transmission.

This has the result that the motor, at a full load start-up and with transmission ratio in the LOW region, runs up to the maximum RPM more quickly.

If, in the manual operational mode of the CVT, the transmission ratio is maintained as a specified shift position as, for example, is described in DE-PS 41 20 540, then the driver must make his shift very quickly in order to obtain an optimum mesh with the next gear position. Since, in accord with the purpose as achieved by the invention, the driver can manually shift into a continuous curve of motor RPM, then the likewise continuous transmission tracks the ratio, in an advantageous way, with help from the predetermined RPM curve and follows with a continuous, forced, up shift. Accordingly, the vehicle reacts without a break in the delivered load, and remains unchanged with an optimum increase in speed, without the necessity that the driver once again must manually intervene.

Conditioned by the large total spread, the highest ratio, i.e. OD, of a CVT is normally greater than that of the greatest stage of an automatic stage transmission. It is possible in the manual operational mode of the CVT in the overdrive ratio, to drive at very low rotational speeds, and therewith, travel at very low rotational speeds for the motor. The critical part here is bringing the vehicle to a stop from such an operational point, especially in connection with a strong braking effort. In order to achieve sufficient drive loading, in the case of a subsequent start-up, the transmission must remain unchanged in the manual operational mode and be shifted in the direction of the start-up ratio. If, in the manual operational mode of the CVT, the transmission ratio is constantly constrained in set gear stages, then the driver, must shift individually through all stages, in the time remaining before stand still, in order to once again drive in LOW.

The situation in regard to coming to a stop out of OD becomes more difficult for the driver in the manual operating mode, because of being accustomed to the comfort of the stopping in the first operational mode with continuous, automatic ratio changing.

The invented manual specification-input by the driver of the RPM of the motor solves the problem in a simple and elegant manner. Conditioned by the optional formulation of the manually selectable RPM curve, the ratio, especially dependent on the speed of the vehicle, makes the transition without stages, as a continuous forced down-shift from the OD-ratio into the LOW-ratio, without necessitating intervention by the driver.

The method, in accordance with the invention, blends together the advantages of the possibilities of driver instigated manual intervention in the operational point guidance of the motor-transmission-unit and the comfort and security of a continuous RPM behavior of the motor by means of a CVT.

Further essential advantages of the invention arise through the integration found in the control of the ratio or RPM of the non-stage transmission. The transition between the speed of rotation curves which are individually, manually selectable are freely formulated. "Soft" shifts, based on need, lead to a noticeable relief of the RPM control or ratio regulation of the variator and improvement of the driving comfort similar in effect to the continuously forced up-shift, in the direction of the greatest speed, and the continuously forced down-shift, in the direction of vehicle stand still. The application output is relatively small. Moreover, special functions, which in the first automatic operational modes of the CVT are available, can be easily integrated into the second manual operational mode.

In a development of the invention, the proposal is made to integrate a start-up element, placed between the drive motor and the variator, in the manual operational strategy. In this way, the operational zone—now limited between the mechanical marginal ratios LOW and OD of the variator—can be extended as long as the start-up element is not fully closed. In the case of a hydrodynamic torque converter with an integrated converter override clutch (WK), the additional hydraulic adjustable area in an open WK is defined by the converter characteristic. In the case of a clutch, the lower limit of the adjustment range is defined by the clutch slip characteristic, as long as the clutch is not completely closed.

In another development of the invention, the proposal is that the manual operational mode of the continuous transmission, because of superimposed input signals, be immediately abandoned and a transition made into the automatic operational mode and, upon the deletion of the superimposed input signal, a return is once again made into the manual operational mode. This back-and-forth switch is not detectable by the driver. Superimposing input signals are, for instance, a kick-down shift command (KD) of the driver, or a message from the anti-blocking system "ABS-Active". In this way, important special functions, which are effective in the automatic operational mode of the CVT, may be mutually incorporated into the manual operational mode in a simple manner.

In the second manual operational mode of the CVT, the driver chooses preselected, curves of the RPM of the motor, by means of a shift lever, which are related to the ratio positioning of the transmission. In the case of a shift command for a change in the RPM curve, the actual RPM curve is transferred by means of a control function to the new RPM curve, starting from the actual operational point, whereby the transition function can be in the form of an optional curve.

In one embodiment the proposal, in keeping with the invention, is to so formulate the transition function that the motor RPM transition, i.e. the variator input RPM or the ratio transition, be computed as a function of the position of the actual operational point, relative to the targeted RPM or relative to the start-up RPM curve. In particular, the proposal is made to control or regulate the motor RPM gradient, between the two motor RPM curves, by means of the ratio of the difference of actual motor RPM and that RPM of the vehicle-speed-corresponding target RPM curve to the vehicle-speed-corresponding difference-RPM between the start-up RPM curve and the target RPM curve.

In an advantageous manner, a "round" RPM transition improves the shifting comfort. This is valid for similar transitions, for instance a change to a high RPM level, such as in a down-shift, as well as motor RPM transitions which are like in form and again similar to ratio transitions. Moreover, round RPM transitions relieve the necessary safety functions of the variator adjustment against undesirable variator slippage.

In the case of a change of the automatic operational mode of the continuous transmission into a manual operational mode, accomplished by the driver by means of a shift or selection apparatus, DE-PS 41 20 540 proposes to first retain the actual transmission ratio. A jump is made to the next neighboring constant ratio, only in the case of a further shifting command of the driver. The amount of the first shift-jump, in an unfavorable case, can be a half or a one-and-a-half of a regular stage shift.

Counter to this, in the invention the proposal is made, in the case of a change from the automatic to the manual operational mode, to retain the RPM, that is, the ratio in accord with the position of the actual operational point, the position being primarily relative to the upper and lower successive predetermined motor RPM curves or variator input RPM curves or yet the ratio curves. In an advantageous manner, a harmonious driving behavior is formed immediately after the operational mode change by the tracking of the RPM, that is, the ratio relative to the non-equidistant curves. Upon the next manual shifting command, the tracking operational point transitions over to the next adjacent RPM curve or ratio curve.

In another embodiment of the operational mode change, in accord with the invention, the proposal is made at first retaining the actual ratio or the actual motor RPM or the actual variator input RPM. If the operational point which, in this way, is only tracking as far as vehicle speed, strikes upon the next preset RPM curve or ratio curve then, henceforth, the operational point will be guided to track along the characteristic curve to the next manual shift command. In an advantageous manner, the operational point will be automatically conducted to a manually selectable RPM characteristic curve, that is, the adjustment characteristic curve.

In a further embodiment of the change of operational mode, it is proposed that directly upon the change from the automatic to the manual operational mode, a change is made to the next higher situated motor RPM curve. In an advantageous manner, this operational mode change strategy gives consideration to the fact that the driver leaves the automatic operational mode directed to the target in order to directly acquire a higher motor capacity or achieve manually an even higher degree of motor brake effect.

BRIEF DESCRIPTION OF THE DRAWINGS

In a further embodiment of the operational mode change, the proposal is that directly upon the change from the automatic to the manual operational mode, to change from one curve to the next lower motor RPM curve.

The invention will be described, by the following, with the aid of the embodiment shown in the drawings. There is shown in.

DETAILED DESCRIPTION OF THE INVENTION

Figure 1:
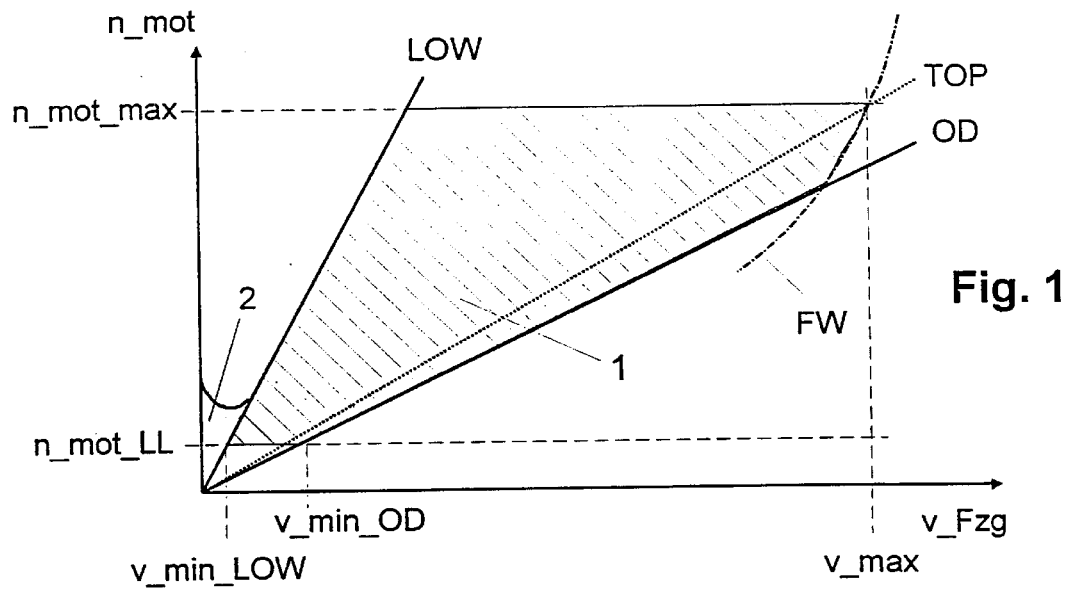
FIG. 1 a variogram of a continuous transmission.

FIG. 1 shows a variogram of a CVT as a function of vehicle velocity $v\_Fzg$ and the RPM of the motor $n\_mot$. The mechanical limits of the transmission, which are conditioned by their construction, are drawn in as direction vectors LOW (greatest possible mechanical ratio) and OD (least possible mechanical ratio) in solid lines. Concerning the vehicle, the operational zone is limited by the driving resistance FW, which is presented as a dashed line, the self determining highest vehicle driving speed $v\_max$ is depicted as a limitation in a dashed line. The transmission ratio, which positions itself by the highest speed, is designated with TOP and its line is drawn in as a vector by points. Regarding the motor, the operational range is limited by the dashed lines for a maximum allowable motor RPM, $n\_mot\_max$ and a minimal allowable motor RPM which, as is the case with customary internal combustion machines is shown by as an idling RPM $n\_mot\_LL$. The zone within these limits, which is the operational zone wherein driving is possible for the motor-transmission-unit is designated as numeral "1" and is crosshatched.

The chosen presentation of the variogram makes clear the limiting confines for the layout of the second manual operational mode. The vehicle speed can also be presented in other velocity-equivalent units, for instance, as the RPM of the transmission output. The expression of the variograms in relation to the motor RPM is advantageous if, in the second operational mode, the motor RPM curves are manually selectable, as this was proposed for a preferred embodiment of the invention. For the invented stipulation of variator input RPM curves, a presentation of the variogram by means of a velocity equivalent signal and the variator input RPM would be advantageous.

Since an internal combustion machine cannot be driven less than its idle RPM n_mot_LL then, there occurs in the greatest possible, mechanical transmission ratio LOW, accordingly the smallest possible, realizable vehicle speed v_min_low. Beneath v_min_low the internal combustion engine would be repressed, as far as RPM goes, and finally would stall, if the mechanical connection between the drive motor and the variator were not open. In the case of usage of a torque converter, with a lock-up clutch as a startup apparatus the said lock-up clutch, in this case, would be open. The extension of the operational area which arises therefrom by the hydraulic converter ratio, is designated and filled with gray in FIG. 1 with 2.

Because of the stalling problem of the driving internal combustion machine, in the case of the adjusted, smallest possible transmission ratio OD, only a driving operation above v_min_OD can be possible. Below this limiting RPM, and with unchanged ratio adjustment of the start-up clutch, i.e. the converter override clutch, must be open or else an enforced down-shift will be introduced.

Figure 2:
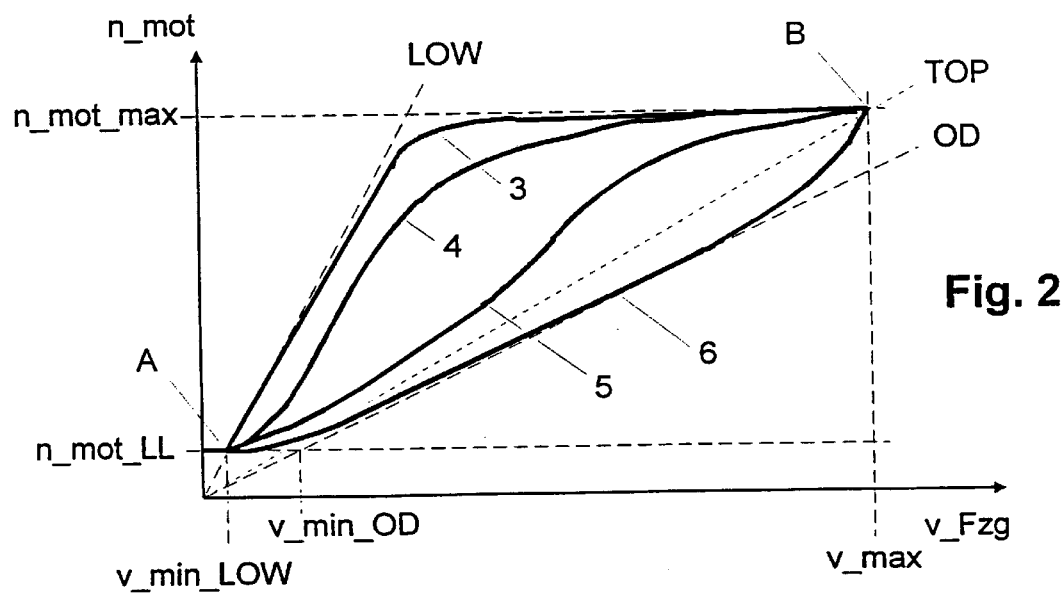
FIG. 2 a variogram of a continuous transmission for an invented second manual operational mode, FIG. 3 a variogram for a second example of an invented, manual operational mode, FIG. 4 a variogram for an invented example of a transition function between two motor RPM curves, and FIG. 5 an X-Y presentation of the transition function in accord with FIG. 4.

In FIG. 2 is presented an invented, manual operational mode, of a continuous transmission, in the given variogram. In this situation, the driver can directly preset various motor RPM's, namely, 3, 4, 5, 6 by means of a shifting or selection apparatus. The presentation of the variogram corresponds with the presentation of FIG. 1. Likewise in correspondence with FIG. 1 are the principal limits of the motor-transmission-unit areas designated as n-mot-LL, n_mot_max, v_max, LOW or OD. Likewise the transmission ratio is designated TOP at the highest speed and the least possible vehicle speed, is designated v_m_LOW with a non-opened start-up element. For 3, 4, 5 and 6, solid lines have been drawn in to designate individual motor RPM curves, which run above the limit speed V_m_LOW and within the mechanical transmission limits LOW and OD. In the driving speed area, underneath the limiting speed V_m_LOW, the start-up element is open and the transmission ratio LOW of the operational point A is retained.

An essential feature of all motor RPM curves is, that they are optionally constructed curve profiles within the ratio limits LOW and OD, and that in each RPM curve, both vehicle stand still as well as maximum speed v_max can be attained.

In this way, provision can also be made to set the start-up ratio at a higher ratio, when vehicle is at stand still, than the mechanically least LOW-ratio allows. This is advantageously done for winter operation.

The number of the motor RPM curves is generally a matter of option. However, this would advantageously lie in a range between six and eight. Besides a significant picture of the transmission spread expressed in motor RPM, there are additional aspects to be considered, notably motor characteristics, vehicle class and the philosophy of the vehicle manufacturer.

In FIG. 2, for example, four motor RPM curves are depicted, which the driver can manually choose by means of a shift or selection apparatus, for instance, by a touch-switch on the steering column. The transmission will convert an actual RPM value to agree with the continuous curve of the variator ratio, which is dependent on the speed of the vehicle. The motor RPM alters itself at the same time to match the vehicle speed in accord with the RPM curve chosen by the driver.

The curve profile 3, of FIG. 2, orients itself to a maximum possible driving capacity. The vehicle would be held in the shortest possible ratio. An essential feature is the round number transition from the low-ratio in the direction of TOP. In an advantageous manner, the vehicle, even after reaching the maximum motor RPM can be additionally accelerated, without a break in the power feed, in accordance with the RPM characteristic "maximum drive capacity" which is intentionally chosen by the driver. To accomplish this, no further manual intervention by the driver is required. Further the RPM-control or the ratio-regulation of the variator is effectively relieved, in an advantageous manner, and the driving comfort clearly increased.

The curve profile 6 yields protective RPMs. The manually selected motor RPM curve in this profile 6 hugs, as close as possible, the highest possible ratio. Essential here are two concepts; first, by means of the continuous ratio adjustment in the upper speed area, the highest speed of the vehicle (that is, operational point B) is attained, without the driver being obliged to manually correct the intended chosen protective characteristic. Second, the continuous forced downshifting in the lower speed area assures a secure reset in the start-up ratio upon stopping.

Especially, in the case of severe braking, the driver is relieved of a quick shifting succession without needing to dispense with a direct intervention on the ratio. Besides, an increase in the driving safety, particularly by means of the optimal, transmission ratio upon start-up, the continuous forced downshift acts positively on the driving comfort.

The curve profiles 4 and 5 show examples of motor RPM curves between the two extreme curves 3 and 6. The formulation of the RPM curves arises, for example, from the idiosyncracies of the motor operational mapping relative to the torque curves incorporated therein.

In an embodiment for the method in accord with FIG. 2, the proposal in accord with the invention is to integrate the start-up element into the operational strategy.

Figure 3:
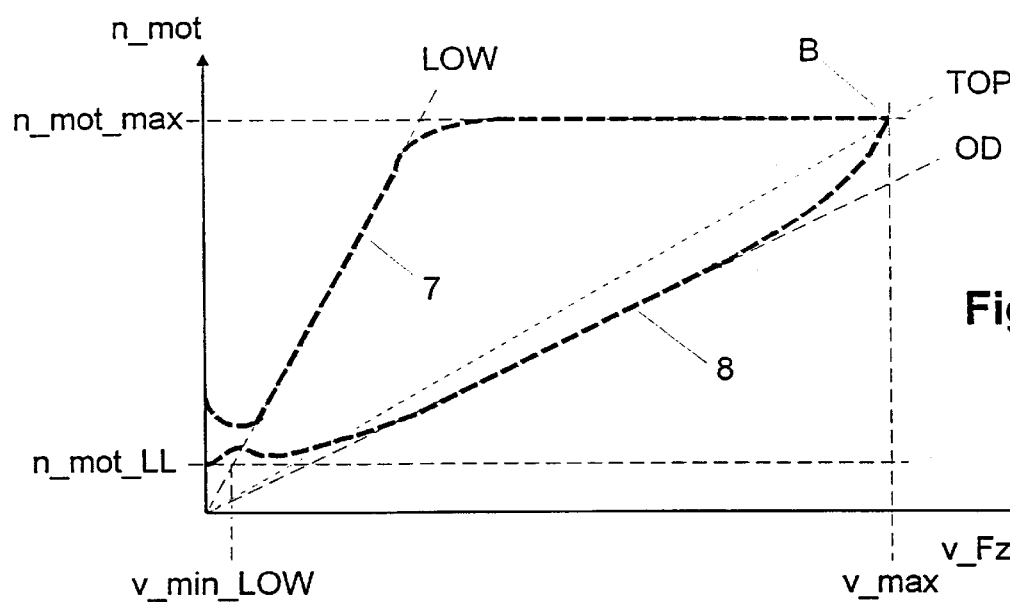

In FIG. 3, to this end a variogram, similar to that in FIG. 2 is shown. The curve profiles 7 and 8 show, in the dashed lines as an example, manually selectable RPM curves in which a hydrodynamic converter, serving as a start-up element, amplifies the usable motor RPM area in the lower speed range by an additional hydraulic adjustment area. In an advantageous manner an increase in the start-up torque can be realized for the vehicle in this way.

A formulation of the method in accord with the invention is thus a predetermined guide line for a motor RPM curve or a variator input RPM curve, or yet a ratio curve, with which the climbing ability of the vehicle is improved by an increase of the start-up torque through manual intervention of the driver.

Figure 4:
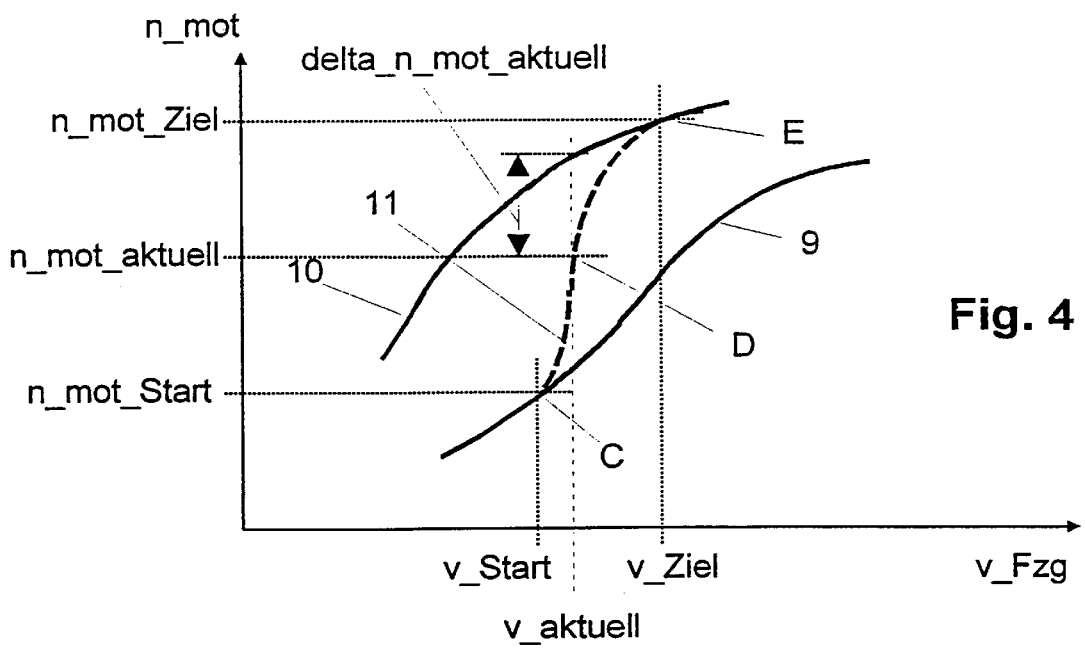

In the variogram of FIG. 4, a preferred example of a transition function between two manually selected RPM curves is depicted. The numeral 9 designates a first manually selected RPM curve. At the start operational point C, which is defined by the coordinates n_mot_Start and v_Start, the driver releases a shift command to obtain the target curve 10 and, in this example, the driver releases a down-shift command for a greater motor RPM. The guiding of the RPM transition from the said start point C to reach the target point E, which is defined by coordinates n_mot_Ziel and n_v_Ziel, orients itself in this transition around that interposed operational point at the difference delta n_mot_aktuell which is that difference between the actual motor RPM n_mot_aktuell and that motor RPM which corresponds to the vehicle speed v_aktuell, the last named RPM lying on the target curve 10. D denotes, as an example, an actual operational point between the said Start operational point C and the target point to be achieved E. The example point E is located at the flex point of the transition curve. On the one hand, because of comfort reasons and, on the other hand, for the relief of the variator regulation, it is of value to begin the transition curve from C with a relative flat RPM gradient. Similarly, it is advantageous to have the transition function expressed in the transition curve of S shape to coincide with the target curve 10 at the desired point E in a soft tangential manner.

Figure 5:
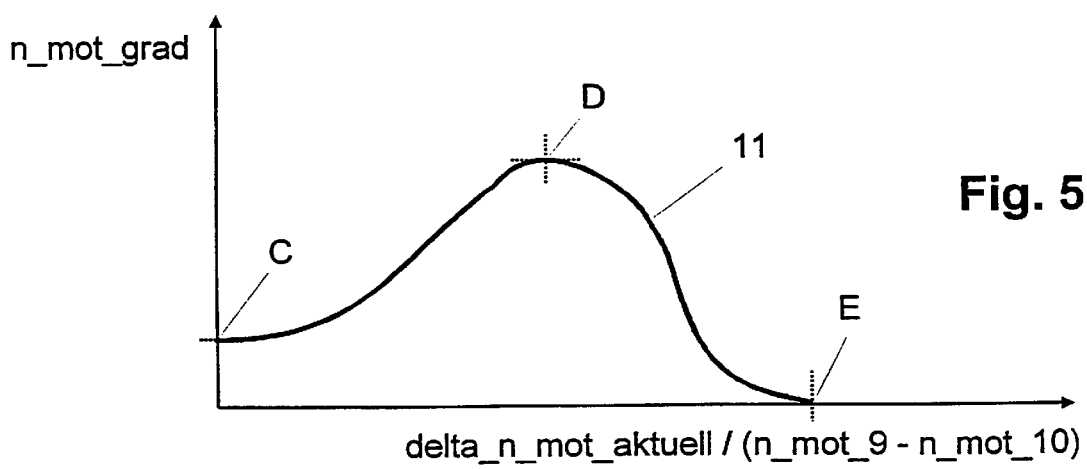

FIG. 5 shows the preferred RPM transition 11, presented in FIG. 4, as an X-Y function diagram. On the X-axis the ratio between delta n_mot_aktuell and the difference between $n_{mot-9}$ and $n_{mot-10}$ is found. In this case, delta n_mot_aktuell is the difference between the actual motor RPM n_mot_aktuell and that RPM which corresponds to the actual vehicle speed as this is shown on the target RPM curve 10 in each operational point of the transition function 11. The RPM n_mot_9 is the RPM on the first RPM curve 9, which corresponds to the actual vehicle speed. The RPM n_mot_10 is that RPM on the second RPM curve 10 which, likewise, corresponds to the actual vehicle speed. On the Y-axis, is the motor RPM gradient n_mot_grad. The operational points C, D and E, which correspond to those letters on FIG. 4.

By means of this continual actualization procedure, reactions can be carried out in an advantageous way in regard to changes related to driving situation changes during manual intervention by the driver, for example in cases of gas-pedal movement or an introduced intermediate braking. This formulation shows itself as being especially of advantage, when the manual intervention occurs when one of the operational active field limits, LOW or OD, is reached.

As another formulation of the transition function, between two motor RPM curves, the proposal is made, in accord with the invention, that the transition function is to be graduated by an adjustable time scale. In an advantageous manner, intended times can be preset by this means for the transition of the RPM curves.

In a further formulation, in accord with the invention, a proposal is made that the transition function, between two motor RPM curves is to so formulated, that the RPM gradient or the ratio gradient during said transition is limited to a predetermined value. In an advantageous manner, in this way comfort can be improved, for instance, by the avoidance of an interruption in acceleration during a change to a curve with a greater RPM (downshifting). Accordingly, also an acceleration increase at an increase to a curve with a lesser RPM (up-shifting) can be effectively prevented.

Reference Numbers

1 Operational area of a motor-CVT-Unit
2 Operational area extension
3, 4, 5, 6, 7, 8 predetermined motor RPM curves
9 Start-up motor RPM curve with a manual shift command
10 Target motor RPM curve with a manual shift command
11 Transition function
12 Lower operational point on the LOW vector
A Operational point for highest vehicle speed
B Start point of an RPM curve change
C Operational point during an RPM curve change
D Target operational point of a RPM curve change

What is claimed is:

1. A method for manually stipulating the ratio of a continuous transmission, which transmission possesses a control apparatus, a selecting apparatus, a start-up apparatus and a variator for a transitional ratio setting, the said transmission be especially that of a motor vehicle powered by an internal combustion machine, wherein the control apparatus in a first automatic operational mode automatically selects and adjusts the transmission ratio in relation to an emitted signal from a driver-vehicle system and in a second manual operational mode, the driver, by means of the selecting apparatus, can intervene directly into the choice of the transmission ratio, whereby in the said second operational mode, pre-stipulated, vehicle speed dependent motor speed of rotation (RPM) curves (3, 4, 5, 6, 7, 8) or pre-stipulated, vehicle speed dependent ratio curves, or pre-stipulated, vehicle speed dependent variator input RPM curves are manually selectable, wherein the motor RPM curves or the ratio curves, or the variator input RPM curves are so formulated as curve profiles between a lower limit (LOW) of the transmission adjustable area and an upper limit (OD) of the transmission adjustable area, that in the case of each curve, vehicle stillstand and the highest vehicle speed can be attained.

2. The method according to claim 1, wherein the start-up apparatus of the transmission is designed as a torque converter, therein characterized, in that the usable motor RPM area for manual intervention is amplified by the hydraulic converter characteristics.

3. The method according to claim 1, whereby the start-up apparatus is designed as a clutch, therein characterized, in that the usable motor RPM area for manual intervention is amplified by a clutch slippage characteristic.

4. The method according to claim 1, wherein the second manual operational mode, upon the presence of a superimposed input signal is immediately abandoned and changed into the first, automatic, operational mode and that upon the deletion of the said superimposed input signal, changes back into the second manual operational mode.

5. The method according to claim 1, wherein the transition between motor RPM curves or variator input RPM curves or ratio curves are controlled and/or regulated by a transition function (11), which is formulated in an optional mathematical curve shape.

6. The method according to claim 5, wherein upon the transition between different motor RPM curves (9, 10) or variator input RPM curves, or ratio curves the motor RPM gradient ($n_{mot-grad}$) or the variator input RPM gradient or the ratio gradient is controlled or regulated by a transition function (11) as a function of the position of the actual operational point (D) relative to the target operational point (E).

7. The method according to claim 5, wherein the target operational point (E) of the transition function (11) is computed as continuously new during the said transition.

8. The method according to claim 1, wherein characterized, in that the motor RPM gradient ($n_{mot-grad}$), upon the transition from a first motor RPM curve (9) to a second motor RPM curve (10) is controlled or regulated as a function of the ratio of the difference ($\Delta n_{mot-actual}$) of actual motor RPM ($n_{mot-actual}$) and the RPM corresponding to the vehicle speed of the second motor RPM curve (10) for a difference RPM between the vehicle speed corresponding RPM ($n_{mot-9}$) on the first RPM curve (9) and RPM ($n_{mot-10}$) corresponding to the vehicle speed on the target RPM curve (10), or in that the RPM gradient upon the transition between different variator input RPM curves will be controlled or regulated as a function of the ratio of the difference of actual variator input RPM curve and the to the vehicle-speed-corresponding-RPM of the target RPM curve to the RPM difference between the vehicle-speed-corresponding-RPM of the first variator input RPM curve and the vehicle-speed-corresponding-RPM of variator input of the target RPM curve, or in that the adjustment gradient upon the transition between different ratio curves is controlled or regulated as a function of the quotient of the actual ratio and vehicle-speed-corresponding-ratio of the target ratio curve to the vehicle-speedcorresponding-ratio difference between start-up and target ratio curves.

9. The method according to claim 1, wherein upon the transition between different motor RPM curves (9, 10) or variator input RPM curves or ratio curves, the motor RPM gradient ($n_{mot\text{-}grad}$) or the variator input RPM gradient or the ratio gradient is controlled or regulated as a function of the position of the actual operational point (D) relative to the start-up point (C).

10. The method according to claim 1, wherein characterized, in that the start-up operational point (c) of the transition function (11) is continuously computed as new during the transmission.

11. The method according to claim 1, wherein the motor RPM gradient ($n_{mot\text{-}grad}$), upon the transition from a first motor RPM curve (9) to a second motor RPM curve (10) is controlled or regulated as a function of the ratio of the difference ($\Delta n_{mot\text{-}actual}$) of actual motor RPM ($n_{mot\text{-}actual}$) and the RPM corresponding to the vehicle speed of the first motor RPM curve (9) for a RPM difference between the vehicle speed corresponding RPM ($n_{mot\text{-}9}$) on the first RPM curve (9) and RPM ($nmot_{-10}$) corresponding to the vehicle speed on the target RPM curve (10), or in that the RPM gradient upon the transition between different variator input RPM curves will be controlled or regulated as a function of the ratio of the difference of actual variator input RPM curve and the to the vehicle-speed-corresponding-RPM of the start-up RPM curve to the RPM difference between the vehicle-speed-corresponding-RPM of the first variator input RPM curve and the vehicle-speed-corresponding-RPM of variator input of the target RPM curve, or in that the adjustment gradient upon the transition between different ratio curves is controlled or regulated as a function of the quotient of the actual ratio and vehicle-speed-corresponding-ratio of the start-up ratio curve to the vehicle-speed-corresponding-ratio difference between start-up and target ratio curves.

12. The method according to claim 5, wherein the transition function (11) is scaled as to time.

13. The method according to claim 5, wherein the transition function (11) is so formulated, that the RPM gradient and/or the ratio gradient is limited to a specified value upon change of the RPM curves or the ratio curves.

14. The method according to claim 5, wherein a running transition function can be terminated by a further shift command and immediately the transition function is started for the change into the new RPM curve or the start-up curve.

15. The method according to claim 5, wherein transition function is so formulated, that the motor RPM curves or the variator input RPM curves or the ratio curves within the limits of the driving area can skip over said limits by means of a manual stipulation.

16. The method according to claim 5, wherein the said "skip over" behavior is computed partially or fully by fuzzy logic.

17. The method according to claim 1, wherein upon the change of the automatic operational mode into the manual operational mode, the position of the actual operational point is first directed to the adjacent, manually selectable motor RPM curves or the variator input RPM curves, or the ratio curves and in that the actual operational point upon the next manual shift command is turned over to the next neighboring RPM curve or ratio curve.

18. The method according to claim 1, wherein upon the change from the automatic into the manual operational mode, the actual operational point first is directed only in accord with the vehicle speed and in that the operational point, following the reaching of the next adjacent motor RPM curve or variator input RPM curve or ratio curve is directed further on this curve until the next manual shift command.

19. The method according to claim 1, wherein upon the change of the automatic into the manual operational mode, the actual operational point is transferred immediately to the next adjacent upper motor RPM curve or variator input RPM curve of ratio curve.

20. The method according to claim 1, wherein upon a change from the automatic into the manual operational mode, the actual operational point is immediately transferred to next lower motor RPM curve or variator input curve or ratio curve.

21. The method according to claim 1, wherein upon the change of the automatic into the manual operational mode, the actual operational point, first, is directed only in accord with the vehicle speed and in that the operational point, after an attainment of the next neighboring motor RPM curve or variator input RPM curve or ratio curve, is directed further on this curve by the next manually selected shift command.

22. The method according to claim 1, wherein upon change of the automatic into the manual operation mode, the actual operational point is guided immediately onto the next neighboring, upper motor RPM curve or variator input RPM curve or ratio curve.

23. The method according to claim 1, wherein upon change of the automatic into the manual operation mode, the actual operational point is guided over to the next, neighboring lower motor RPM curve or variator input RPM curve or ratio curve.

* * * * *